United States Patent [19]

Lemahieu et al.

[11] 4,311,787
[45] Jan. 19, 1982

[54] PHOTOGRAPHIC SILVER HALIDE MATERIALS CONTAINING DISPERSED LIGHT-ABSORBING MEROSTYRYL DYES

[75] Inventors: Raymond G. Lemahieu, Mortsel; Felix J. Moelants, Wilrijk; Frans J. Ville, Edegem, all of Belgium

[73] Assignee: Agfa-Gevaert, N.V., Mortsel, Belgium

[21] Appl. No.: 158,450

[22] Filed: Jun. 11, 1980

[30] Foreign Application Priority Data

Jun. 29, 1979 [GB] United Kingdom .............. 22724/79

[51] Int. Cl.³ .............................................. G03C 1/84
[52] U.S. Cl. .................................... 430/522; 430/513
[58] Field of Search ................ 430/513, 522, 580, 595

[56] References Cited

U.S. PATENT DOCUMENTS

| | | | |
|---|---|---|---|
| 3,544,325 | 12/1970 | Depoorter et al. | 430/522 |
| 3,615,546 | 10/1971 | Depoorter et al. | 430/522 |
| 3,853,563 | 12/1974 | Depoorter et al. | 430/514 |
| 3,984,247 | 10/1976 | Nakamura et al. | 430/522 |

*Primary Examiner*—J. Travis Brown
*Attorney, Agent, or Firm*—A. W. Breiner

[57] ABSTRACT

Light-sensitive photographic silver halide material comprising a hydrophilic colloid layer containing in dispersed state a light-absorbing merostyryl dye that corresponds to the following general formula:

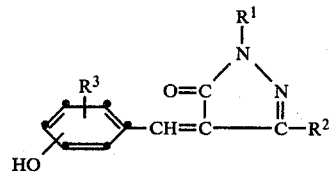

in which:
$R^1$ is hydrogen, alkyl, substituted alkyl, aryl, substituted aryl, aralkyl or substituted aralkyl,
$R^2$ is carboxy, alkoxycarbonyl, aryloxycarbonyl, carbamoyl, ureido, sulphamoyl or one of the groups represented by $R^1$;
at least one of $R^1$ and $R^2$ being or containing carboxy or carbamoyl,
$R^3$ is hydrogen, $C_1$-$C_4$ alkyl, $C_1$-$C_4$ alkoxy, and when $R^3$ is alkyl or alkoxy it stands in ortho or para in respect of the hydroxy group, which itself is in ortho or para in respect of the methine group,
said merostyryl dye containing no group that renders the dye soluble in the hydrophilic colloid layer.

7 Claims, 2 Drawing Figures

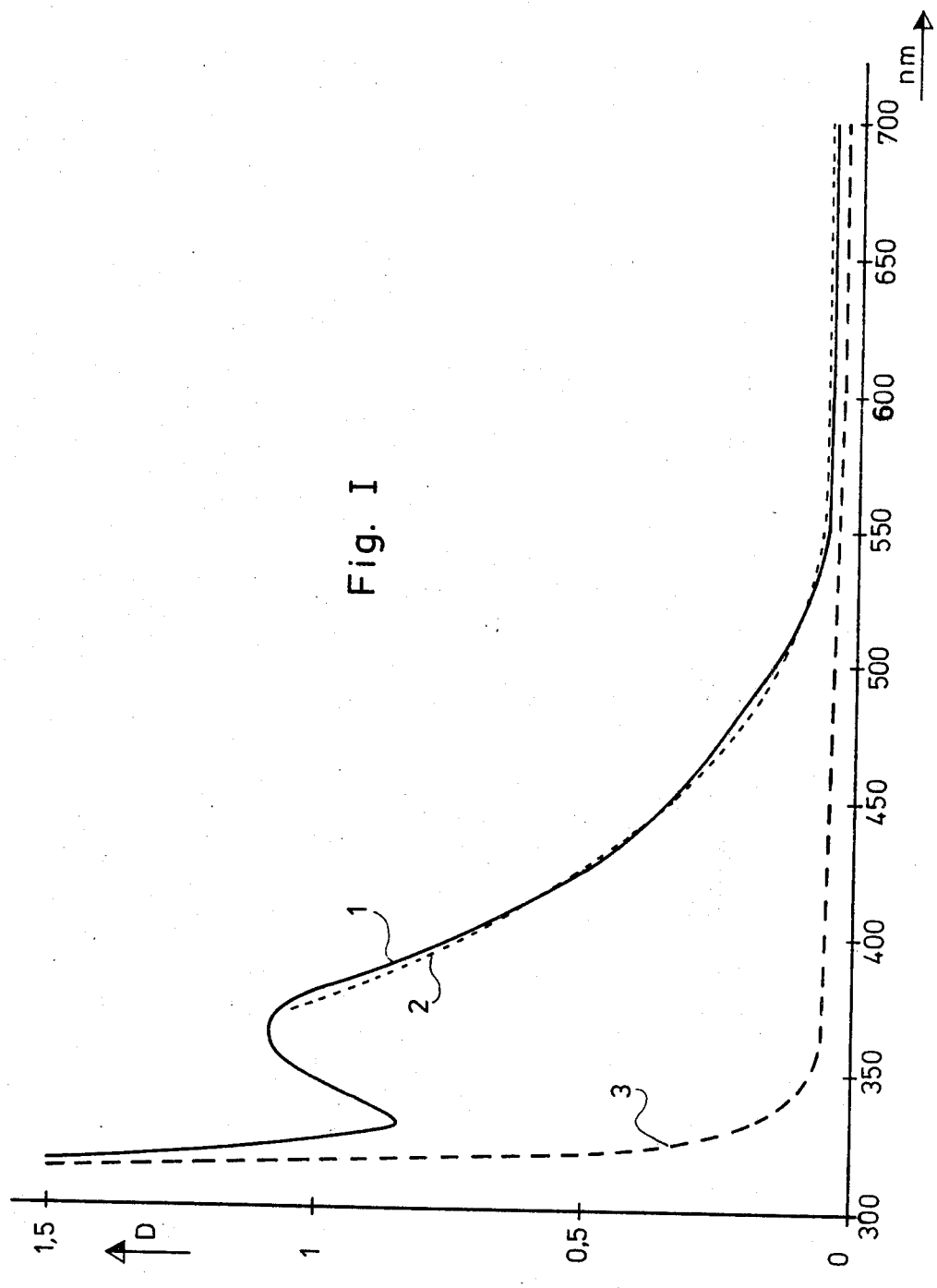
Fig. I

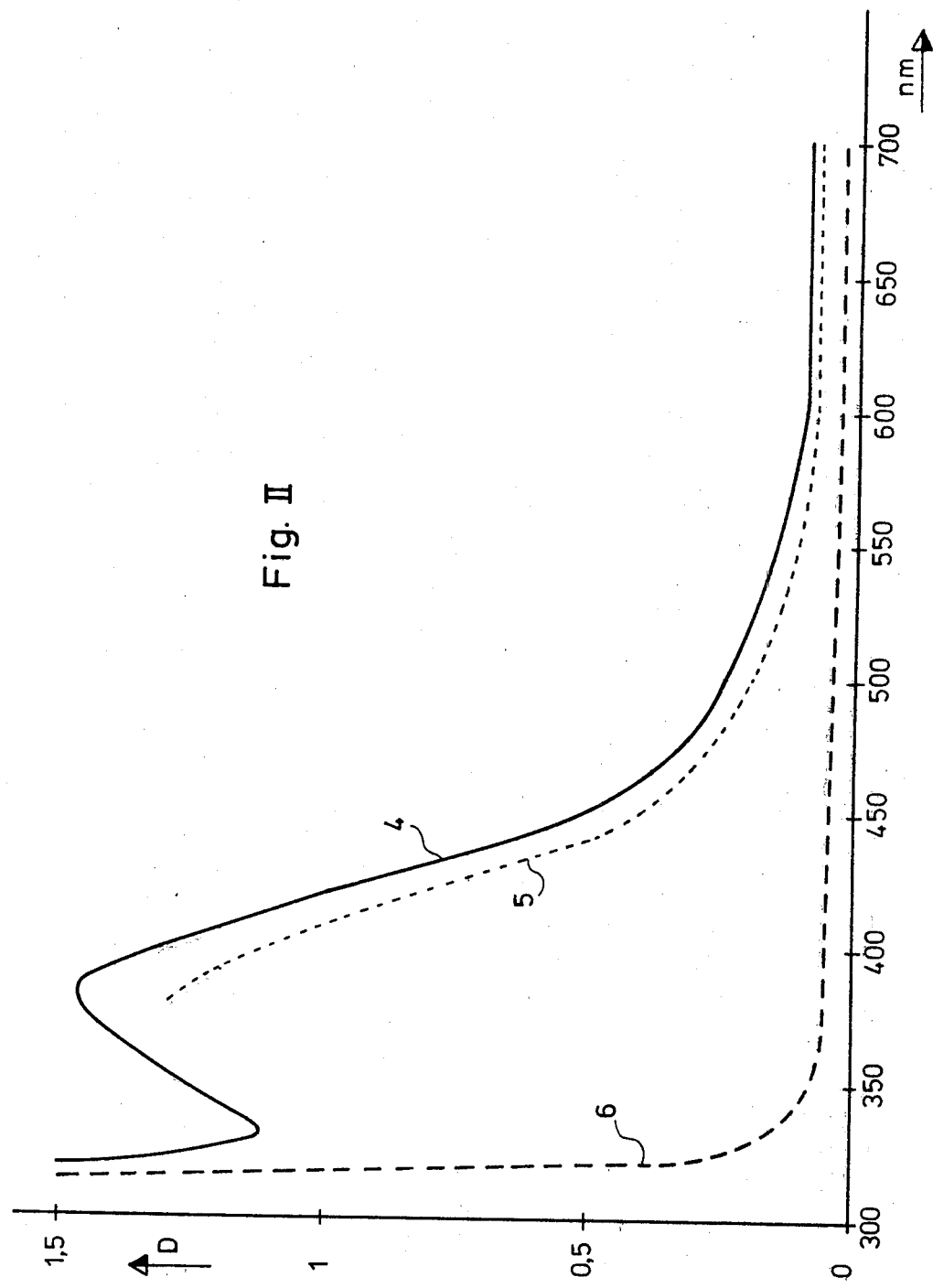

PHOTOGRAPHIC SILVER HALIDE MATERIALS CONTAINING DISPERSED LIGHT-ABSORBING MEROSTYRYL DYES

The present invention relates to photographic silver halide materials containing dispersed light-absorbing merostyryl dyes.

It is known to incorporate for many purposes light-absorbing dyes into photographic materials. Such light-absorbing dyes can be used as filter dyes in a layer coated over one or more light-sensitive emulsion layers or between two adjoining emulsion layers e.g. differently colour-sensitized emulsion layers, for the purpose of protecting the underlying light-sensitive emulsion layer(s) from the action of light of a wavelength range absorbed by such light-absorbing dyes. Light-absorbing dyes can also be used as so-called screening dyes in silver halide emulsion layers to avoid light-scattering therein and thus to promote image sharpness.

These dyes should be non-migratory and capable of being removed and/or decolourized in at least one of the processing baths. They must not give rise to the formation of fog or to loss of speed in the emulsion layer(s).

Very important is the use of light-absorbing dyes as antihalation dyes. Halation arises as a consequence of the reflection of light by the film support onto the light-sensitive coating(s). This reflection is counteracted usually by applying to either side of the support carrying the light-sensitive emulsion layer(s), a light-absorbing layer generally called antihalation layer. Such an antihalation layer may consist of a dye or pigment dispersed in a natural or synthetic binder. The antihalation dye or pigment should absorb light, to which the photographic layer is sensitive. It should have no noxious influence on the emulsion and must not scale off and yet be easily eliminated without contamination of the processing baths.

So far, manganese dioxide has been widely used as antihalation pigment especially in graphic arts material for line and screen work and although it has favourable absorption characteristics, it suffers from several disadvantages. First of all manganese is a heavy metal, which for ecological reasons, should not be discharged into the waste waters. Furthermore, the handling of manganese dioxide is rather unpleasant because it is dusty and smears the hands. In fixing baths white manganese salts are formed, which are prejudicial to the appearance of the image and which cause dustiness of the processed material. Finally, in high temperature rapid processing or when diluted or exhausted fixing baths are used, manganese dioxide is not discoloured completely and consequently it induces a brownish hue in the processed material and in the processing baths.

There have been numerous attempts to find light-absorbing dyes for use as antihalation dye instead of manganese dioxide and for use as filter dye or screening dye. Many dyes have been found to present interesting properties. However it is extremely difficult to find dyes that have the above-mentioned properties and nevertheless present none of the disadvantages referred to.

Important dyes for use as antihalation and filter dyes are those of the oxonol type, generally oxonol dyes of the pyrazolone series.

Among the known filter dyes, those which can easily be washed out as a result of their solubilizing groups are generally not sufficiently resistant to diffusion in the photographic layers. Light-absorbing dyes having water-solubilizing groups e.g. sulpho groups or carboxy groups for use in dissolved form in colloid layers have been disclosed e.g. in the Japanese Patent Specification 201,903 filed Sept. 27, 1950 and in the Japanese Patent Publication 10,578/56 filed Sept. 5, 1953 both by Konishiroku Photographic Industrial Company, Ltd.

Dyes that have been fixed in a diffusion-resistant form by the introduction of longer fatty radicals into the dye molecule are generally difficult to wash out in spite of the presence of water-solubilizing groups.

For the rapid processing of photographic materials, in which the various stages of the process should be completed within a very short time, the dyes must satisfy even higher standards with regard to the possibility of decolourizing and washing them out.

In summary the dyes for use as antihalation and filter dyes should have desired absorption characteristics. They should be readily rendered ineffective i.e. decolourized or destroyed and removed completely and quickly in the photographic processing liquids. They should also be sufficiently non-wandering i.e. they must not substantially diffuse from the layers, in which they have been incorporated, to other layers e.g. from a filter layer or antihalation layer to a silver halide emulsion layer, either during the manufacture, the storage, or the processing of the photographic material. Finally, the preparation of these dyes should preferably be simple and inexpensive.

The invention provides a light-sensitive photographic silver halide material comprising a hydrophilic colloid layer containing a light-absorbing merostyryl dye, wherein said dye is present in dispersed state and corresponds to the following general formula:

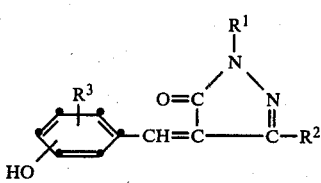

in which:
- $R^1$ represents hydrogen, a $C_1$–$C_4$ alkyl group e.g. methyl, propyl, isopropyl, butyl, a substituted $C_1$–$C_4$ alkyl group e.g. trifluoroethyl, cyanoethyl, and hydroxyethyl, an aryl group e.g. phenyl, tolyl, a substituted aryl group e.g. carboxyphenyl, dicarboxyphenyl, an aralkyl group, or a substituted aralkyl group,
- $R^2$ represents one of the groups represented by $R^1$, a carboxy group, an alkoxycarbonyl group, an aryloxycarbonyl group, a carbamoyl group, an ureido group, or a sulfamoyl group,
- at least one of $R^1$ and $R^2$ being or containing a carboxy group or a carbamoyl group preferably carboxyphenyl or dicarboxyphenyl,
- $R^3$ represents hydrogen, a $C_1$–$C_4$ alkyl group, or a $C_1$–$C_4$ alkoxy group e.g. methoxy, and when $R^3$ is a $C_1$–$C_4$ alkyl group or a $C_1$–$C_4$ alkoxy group, it stands in ortho- or para-position in respect of the hydroxy group, which itself is in ortho- or para-position in respect of the methine group, said merostyryl dye containing no group that renders the dye soluble in the hydrophilic colloid layer.

When used in dispersed state in photograhic materials the merostyryl dyes corresponding to the above general formula offer a relatively broad and fairly uniform absorption spectrum as compared with the dissolved state, which makes the photographic material less dependent on a particular spectrum for the exposure sources. Therefore, the dyes should not contain a water-solubilizing group e.g. a sulpho group, a salt of a sulpho group, or a salt of a carboxy group.

The dispersed dyes corresponding to the general formula meet the demands made on light-absorbing dyes for photographic silver halide materials. They are readily compatible with photographic binders e.g. gelatin and they can easily be incorporated into the photographic material. Moreover they possess a high absorptive power. Below pH 7 they do not migrate in hydrophilic colloid layers and do not dissolve in water, whereas they dissolve readily in water above pH 7. Although during processing they decolour very quickly, even in rapid processing, they are very stable in coating compositions. Furthermore, they are discharged quickly, completely, and irreversibly in an alkaline processing solution, e.g. a developing solution, without forming coloured degradation products, so that there is no residual colour in the material after the processing, nor in the processing liquid.

In the following table I representative examples of merostyryl dyes, which may be used according to the present invention, are given. However, it is to be understood that the invention is not limited to these specific merostyryl dyes.

TABLE 1

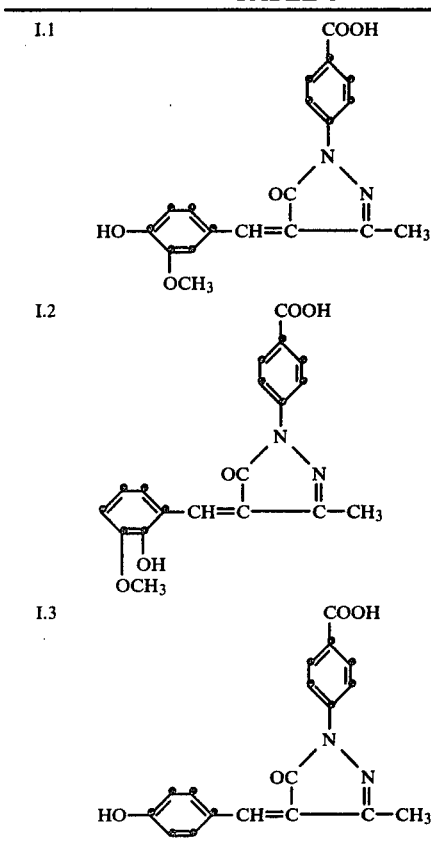

TABLE 1-continued

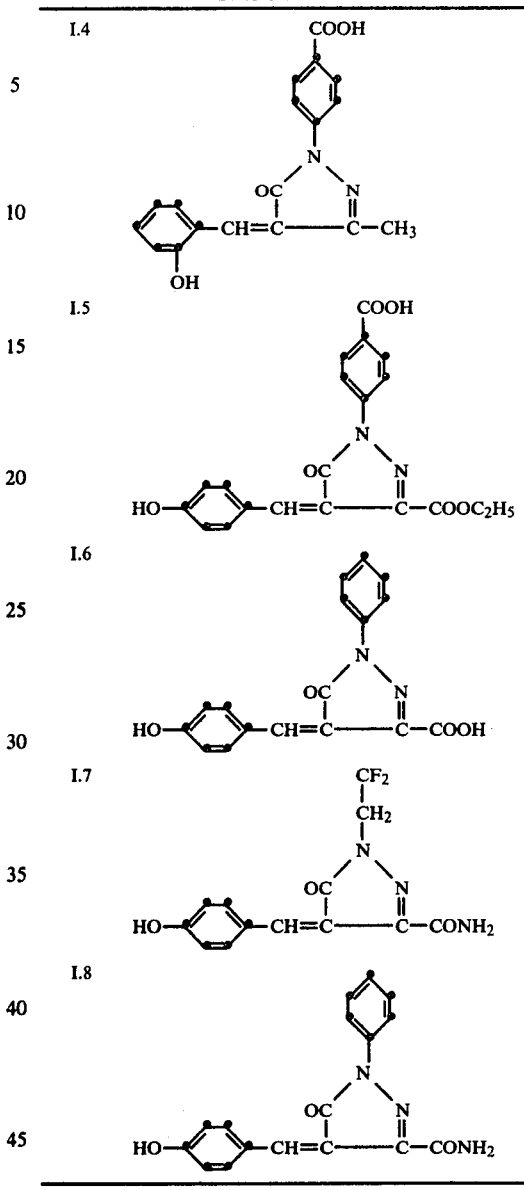

As is illustrated by the following preparations the dyes used according to the present invention can be prepared in a simple and inexpensive way by making an appropriately 1,3-substituted 2-pyrazolin-5-one compound react with a hydroxybenzaldehyde e.g. p-hydroxybenzaldehyde, salicylaldehyde, and (iso)vanillin.

Preparation 1: compound 1

1-(p-carboxyphenyl)-3-methyl-4-(3'-methoxy-4'-hydroxybenzylidene)-2-pyrazolin-5-one 218 g (1 mole) of 1-p-carboxyphenyl-3-methyl-2-pyrazolin-5-one and 152 g (1 mole) of vanillin were dissolved in 500 ml of dimethylformamide. The reaction mixture was heated for 3 h at 100° C. After cooling down to room temperature the crystallized dye was filtered with suction and rinsed with methanol.

Yield: 332 g. Melting point: >250° C.

Preparation 2: compound 2

1-(p-carboxyphenyl)-3-methyl-4-(2'-hydroxy-3'-methoxybenzylidene)-2-pyrazolin-5-one 218 g (1 mole) of 1-p-carboxyphenyl-3-methyl-2-pyrazolin-5-one and 152 g (1 mole) of iso-vanillin were suspended in 1000 ml of acetic acid and refluxed for 3 h. After cooling down to room temperature the dye was filtered with suction and rinsed with acetone.

Yield: 300 g. Melting point: >250° C.

Preparation 3: compound 3

1-(p-carboxyphenyl)-3-methyl-4-(p-hydroxybenzylidene)-2-pyrazolin-5-one 218 g (1 mole) of 1-p-carboxyphenyl-3-methyl-2-pyrazolin-5-one were suspended in 600 ml of dimethylformamide. The mixture obtained was heated with stirring to 100° C., whereupon a solution of 122 g (1mole) of p-hydroxybenzaldehyde in 400 ml of methanol was added. The dissolution of both compounds was complete. The dye started crystallizing after some 30 min. The heating was stopped after 2 h and the reaction mixture was allowed to cool down to room temperature. The dye was filtered with suction and rinsed with methanol.

Yield: 290 g. Melting point: >250° C.

Preparation 4: compound 4

1-(p-carboxyphenyl)-3-methyl-4-(o-hydroxybenzylidene)-2-pyrazolin-5-one 218 g (1 mole) of 1-p-carboxyphenyl-3-methyl-2-pyrazolin-5-one were suspended in 1000 ml of acetic acid. The suspension was heated to boiling temperature and 112 g (1 mole) of salicyladehyde were added. In the resulting solution the dye started crystallizing very quickly. After 2 h of refluxing the reaction mixture was cooled to room temperature. The dye was filtered with suction and rinsed with acetone.

Yield: 171 g. Melting point: >250° C.

Preparation 5: compound 5 b 1-(p-carboxyphenyl)-3-ethoxycarbonyl-4-(p-hydroxybenzylidene)-2-pyrazolin-5-one 276 g (1 mole) of 1-(p-carboxyphenyl)-3-ethoxycarbonyl-2-pyrazolin-5-one and 122 g (1 mole) of p-hydroxybenzaldehyde were dissolved in 1000 ml of acetic acid. The reaction mixture was refluxed for 3 h. The dye crystallized partially. After cooling to room temperature the dye was filtered with suction and rinsed with acetone.

Yield: 294 g. Melting point: >250° C.

Preparation 6: compound 6

1-phenyl-3-carboxy-4-(p-hydroxybenzylidene)-2-pyrazolin-5-one 204 g (1 mole) of 1-phenyl-3-carboxy-2-pyrazolin-5-one and 122 g (1 mole) of p-hydroxybenzaldehyde were dissolved in 1000 ml of methanol. After a few minutes of refluxing the dye started crystallizing and after 1 h of boiling the reaction mixture was cooled to room temperature. The dye was filtered with suction and rinsed with methanol.

Yield: 190 g Melting point: >250° C.

Preparation 7: compound 7

1-trifluoroethyl-3-carbamoyl-4-(p-hydroxybenzylidene)-2-pyrazolin-5-one 0.1 mole of 1-trifluoroethyl-3-carbamoyl-2-pyrazolin-5-one and 0.1 mole of p-hydroxybenzaldehyde were stirred for 1 hour in 150 ml of boiling ethylene glycol monomethyl ether. The solvent was distilled off under reduced pressure and the yellow dye was crystallized from methanol.

Yield: 13 g. Melting point: >250° C.

Preparation 8: compound 8

1-phenyl-3-carbamoyl-4-(p-hydroxybenzylidene)-2-pyrazolin-5-one 20.5 g (0.1 mole) of 1-phenyl-3-carbamoyl-2-pyrazolin-5-one and 12.2 g (0.1 mole) of p-hydroxybenzaldehyde were stirred for 1 hour in 100 ml of boiling dimethylformamide. The hot reaction mixture was poured out in 500 ml of an aqueous solution of sodium chloride (12%). After stirring and standing for a while, the yellow dye was filtered with suction, rinsed with water, and washed with hot acetone.

Yield: 9.7 g. Melting point: >250° C.

The merostyryl dyes used according to the invention are insoluble in water below pH 7 but readily dissolve above pH 7. In weakly alkaline medium already they form the quinonoid structure, which reaction is accompanied with a bathochromic shift of some 100 nm. The quinonoid structure is not stable in aqueous alkaline medium and hydrolyses to form the starting products again, which are easily discharged in the processing liquids. The absorption characteristics of the representative dyes used according to the present invention are listed in the following table II.

TABLE II

| Dye no. | Absorption maximum (in nm) | $\epsilon \times 10^{-4}$ | measured in |
| --- | --- | --- | --- |
| I.1 | 392 | 3.64 | methanol |
| I.2 | 434 | 2.67 | " |
| I.3 | 472 | 4.7 | methanol/triethylamine (100:1) |
| I.4 | 384 | 1.55 | methanol |
| I.5 | 498 | 3.65 | methanol/triethylamine (100:1) |
| I.6 | 482 | 2.89 | methanol/triethylamine (100:1) |
| I.7 | 498 | 7.13 | dimethylformamide |
| I.8 | 498 | 5.89 | " |

The dyes used according to the invention can be incorporated in hydrophilic colloid compositions according to any of the dispersion techniques known for incorporating water-insoluble colour couplers in hydrophilic colloid media.

According to the present invention it is preferred to prepare a dispersion of the dyes in an aqueous hydrophilic colloid composition by finely grinding the water-insoluble dyes in a mill e.g. a ball mill, a sand mill, or a colloid mill in the presence of one or more dispersing agents; the hydrophilic colloid e.g. gelatin is added after or before the milling process. The dispersion obtained can then be mixed with other ingredients to form a coating composition for a hydrophilic colloid layer of a photographic silver halide material.

The dispersed dyes used according to the invention can be incorporated in any photographic material comprising light-sensitive silver halide, whenever easily dischargeable dye-stuffs are desired or needed, e.g. such materials containing a support. Thus the dyes are particularly suitable for use in an antihalation layer between the support and a light-sensitive silver halide emulsion, because they do not diffuse into the emulsion layer.

They can also be used in antihalation layers applied to the side of the support opposite to that carrying the emulsion layer. Furthermore, they can also be used successfully as filter dye in a colloid filter layer of a light-sensitive photographic multilayer material e.g. a colour material shielding at least one optically sensitized silver halide emulsion layer from the light of the wavelength absorbed by the said dye.

The dispersed merostyryl dyes are especially suited for use as antihalation dyes in silver halide materials for the graphic arts, more particularly for screen- and linework, since these dyes besides absorbing in the blue region of the spectrum have a sufficiently high ultraviolet absorption to be capable of replacing manganese dioxide at least partially as an antihalation substance. After the treatment in an alkaline processing liquid the ultraviolet absorption has disappeared.

The dyes are further especially suited for replacing colloidal silver in yellow filter layers e.g. as used in multicolour materials. A classical yellow filter layer essentially consisting of a colloidal silver dispersion has too broad an absorption range and consequently reduces the speed of the light-sensitive layers to be exposed through the colloidal silver filter layer. The dispersed dyes used according to the invention do not substantially absorb beyond the desired spectral range of the yellow filter layer.

The dyes used according to the invention can be combined with other dyes so as to obtain a desired absorption spectrum in a filter layer or in an antihalation layer. Examples of such other dyes are e.g. the blue dyes described in the U.S. Patent Specification 4,092,168 of Raymond Gerard Lemahieu, Henri Depoorter and Willy Joseph Vanassche, issued May 30, 1978, the published German Patent Application (DE-OS) 2,453,217 filed Nov. 9, 1974 by Agfa-Gevaert A.G., and British patent application No. 7,907,440 filed March 2, 1979 by Agfa-Gevaert N.V., and in particular dyes of the following table III.

TABLE III

| Dye | n | X | Y |
|---|---|---|---|
| III.1 | 2 | $CF_3-CH_2-$ | $-COOH$ |
| III.2 | 2 | ⟨benzene ring⟩—COOH | $-CH_3$ |
| III.3 | 2 | ⟨benzene ring⟩—COOH | $-COOH$ |
| III.4 | 2 | ⟨benzene ring with COOH⟩ | $-CH_3$ |
| III.5 | 2 | $-C(CH_3)_3$ | $-COOH$ |
| III.6 | 2 | ⟨thiophene-S-O_2, H⟩ | $-COOH$ |
| III.7 | 2 | ⟨thiophene-S-O_2, H⟩ | $-CONH(CH_2)_2OH$ |
| III.8 | 2 | ⟨thiophene-S-O_2, H⟩ | $-COOC_2H_5$ |

Other dyes that can be used in addition thereto are dyes absorbing in the green region of the spectrum e.g. dyes of the foregoing structure wherein n is 1.

Further dyes that can be successfully combined with the dyes used according to the invention are the red dyes corresponding to the formulae:

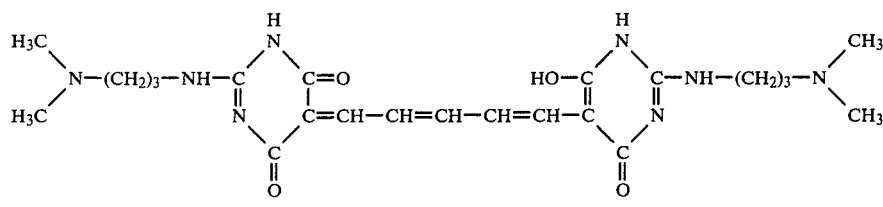

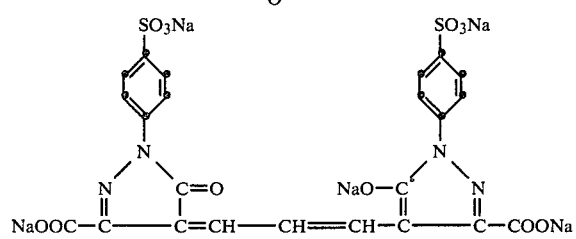

It is also possible to add to the dye dispersions used according to the invention other compounds as well e.g. compounds improving the capability of an antihalation backing layer of being written on by pencil, compounds improving the erasability of pen markings on such backing layer, compounds counteracting the formation of comets, antistatic agents, wetting agents, hardening agents, matting agents, etc.

The hydrophilic colloid binder of the layers containing a dye corresponding to the general formula is usually gelatin. Other hydrophilic colloids such as casein, polyvinyl alcohol, poly-N-vinyl pyrrolidone, sodium alginate, sodium carobxymethylcellulose, etc. can also be used.

When the dyes corresponding to the general formula are used in antihalation coatings applied to the side of the support opposite to that carrying the emulsion layer(s), these antihalation coatings may contain a water-insoluble, alkali-soluble polymeric binder applied to a hydrophobic film support e.g. a polyethlene terephthalate support. More details about water-insoluble, alkali-soluble polymeric binders suitable for this purpose and other features of such antihalation coatings can be found in the U.S. Pat. No. 3,853,563 of Herni Depoorter and Felix Jan Moelants, issued December 10, 1974. Preferred water-insoluble, alkali-soluble binders are co(styrene/acrylic acid) and co(vinyl acetate/maleic acid).

The following example illustrates the present invention.

EXAMPLE

Material A 3 g of compound 3 of table 1 were mixed with 300 g of "Ottawa-sand", 0.300 g of sodium oleylmethyltauride, and a small amount of water, until a highly viscous paste was obtained. This mixture was ground in a sand mill for 3 hours, whereupon the mixture was filtered through a glass filter. The sand remaining on the filter was rinsed with water to remove the adsorbed dye from the sand particles.

The filtrate was added to a solution of 21.5 g of gelatin in 193.5 ml of water.

The gelatin dispersion thus obtained was coated on a film support in such a way that 0.280 g of compound 3 and 2 g of gelatin were present per sq.m.

The dyed gelatin layer was coated with a gelatin antistress layer containing 5 g of gelatin per sq.m.

Material B 3 g of compound 1 of table 1 were mixed with 300 g of "Ottawa-sand," 0.300 g of sodium oleylmethyltauride, and a small amount of water, until a highly viscous paste was obtained. This mixture was ground in a sand mill for 3 hours, whereupon the mixture was filtered through a glass filter. The sand remaining on the filter was rinsed with water to remove the adsorbed dye from the sand particles.

The filtrate was added to a solution of 25 g of gelatin and 175 ml of water.

The gelatin dispersion thus obtained was coated on a film support in such a way that 0.300 g of compound 1 and 5 g of gelatin were present per sq.m.

The dyed gelatin layer was coated with a gelatin antistress layer containing 2 g of gelatin per sq.m.

In the accompanying drawings, FIG. I and II give the absorption curves (density D versus wavelength in nm) of materials A and B before any treatment of the materials as well as after treatment for 1 min in demineralized water and after a sequence of treatments corresponding to conventional black-and-white processing of exposed photographic material which includes 20 s of development at 38° C., 10 s of rinsing, 20 s of fixing, 20 s of rinsing, and 10 s of drying.

In FIG. I curve 1 is the absorption curve of material A before any treatment. Curve 2 is the absorption curve of material A after having been rinsed for 1 min with demineralized water at 20° C. Curve 3 is the absorption curve of material A after the processing sequence as specified above.

In FIG. II curve 4 is the absorption curve of material B before any treatment. Curve 5 is the absorption curve of material B after having been rinsed for 1 min with demineralized water at 20° C. Curve 6 is the absorption curve of material B after the processing sequence as specified above.

From a comparison of curves 2 and 5 respectively with curves 1 and 4 respectively it clearly appears that the dyes used according to the invention are highly resistant to diffusion since the absorption remains almost unaltered after rinsing with water.

The absorption curves 3 and 6 respectively show that both materials A and B are completely discoloured after the processing sequence.

We claim:

1. A light-sensitive photographic silver halide material comprising a hydrophilic colloid layer containing a light-absorbing merostyryl dye, wherein said dye is present in dispersed state and corresponds to the following general formula:

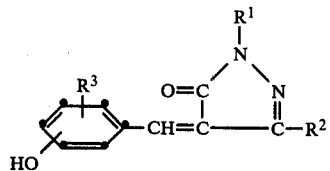

in which:

$R^1$ represents hydrogen, a $C_1$–$C_4$ alkyl group, a substituted $C_1$–$C_4$ alkyl group, an aryl group, a substituted aryl group, an aralkyl group or a substituted aralkyl group, $R^2$ is one of the groups represented by $R^1$, a carboxy group, an alkoxycarbonyl group, an aryloxycarbonyl group, a carbamoyl group, an ureido group, or a sulfamoyl group, at least one of $R^1$ and $R^2$ being or containing a carboxy group or a carbamoyl group, $R^3$ represents hydrogen, a $C_1$–$C_4$ alkyl group, or a $C_1$–$C_4$ alkoxy group, and where $R^3$ is a $C_1$–$C_4$ alkoxy group or a $C_1$–$C_4$ alkoxy group, it stands in ortho- or para-position in respect of the hydroxy group, which itself is in ortho- or para-position in respect of the methine group, said merostyryl dye containing no group that renders the dye soluble in the hydrophilic colloid layer.

2. A material according to claim 1, wherein said dye is dispersed in gelatin.

3. A material according to claim 1, comprising a support, at least one light-sensitive silver halide emulsion layer, and a layer containing dispersed therein said light-absorbing merostyryl dye.

4. A material according to claim 3, wherein the layer containing said light-absorbing merostyryl dye is a hydrophilic colloid antihalation layer coated at the side of the support carrying the light-sensitive silver halide emulsion layer(s).

5. A material according to claim 3, wherein the layer containing said light-absorbing merostyryl dye is an antihalation layer applied to the side of the support opposite to that carrying the light-sensitive silver halide emulsion layer(s).

6. A material according to claim 3, wherein the layer containing said light-absorbing merostyryl dye is a colloid filter layer shielding at least one optically sensitized silver halide emulsion layer from the light of the wavelength absorbed by said dye.

7. A material according to claim 5, wherein the support is a film support and the antihalation layer applied to the side of the support opposite to that carrying the light-sensitive silver halide emulsion layer(s) comprises a water-insoluble, alkali-soluble binder.

* * * * *